(12) United States Patent
Sakatani

(10) Patent No.: US 10,148,828 B2
(45) Date of Patent: Dec. 4, 2018

(54) IMAGE FORMING APPARATUS, IMAGE FORMING SYSTEM, AND NON-TRANSITORY RECORDING MEDIUM STORING A COMPUTER READABLE PROGRAM

(71) Applicant: Konica Minolta, Inc., Tokyo (JP)

(72) Inventor: Kazuomi Sakatani, Machida (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/675,620

(22) Filed: Aug. 11, 2017

(65) Prior Publication Data

US 2018/0048772 A1 Feb. 15, 2018

(30) Foreign Application Priority Data

Aug. 12, 2016 (JP) .................................. 2016-158406

(51) Int. Cl.
- *H04N 1/00* (2006.01)
- *H04N 1/38* (2006.01)
- *H04N 1/60* (2006.01)

(52) U.S. Cl.
CPC ..... *H04N 1/00045* (2013.01); *H04N 1/00031* (2013.01); *H04N 1/38* (2013.01); *H04N 1/6033* (2013.01); *H04N 1/00002* (2013.01); *H04N 1/00015* (2013.01); *H04N 1/00023* (2013.01); *H04N 1/00238* (2013.01)

(58) Field of Classification Search
CPC .... H04N 1/00045; H04N 1/6033; H04N 1/38; H04N 1/00031; H04N 1/00238; H04N 1/00002; H04N 1/00015; H04N 1/00023
See application file for complete search history.

(56) References Cited

FOREIGN PATENT DOCUMENTS

| JP | 2012-203015 | 10/2012 |
|---|---|---|
| JP | 2016-100620 | 5/2016 |

*Primary Examiner* — Christopher D Wait
(74) *Attorney, Agent, or Firm* — Baker & Hostetler LLP

(57) ABSTRACT

An image forming apparatus includes an image generating unit for generating a job image, a color verification image generating unit, a color converting unit for performing the same color conversion on the job image and the color verification image, a printing unit for printing the job image and the color verification image subjected to the color conversion, a colorimetry device for measuring the colors of a printout of the color verification image, a storage unit, a storing control unit for storing the job image in the storage unit in association with the color verification image and colorimetrical values thereof, and a reprinting control unit, wherein the printing unit performs a test print of the stored color verification image before reprinting, and the reprinting control unit compares colorimetrical values obtained during the test print with stored past colorimetrical values and outputs color differences.

21 Claims, 9 Drawing Sheets

| JOB | JOB IMAGE | COLOR VERIFICATION IMAGE | COLORIMETRICAL VALUE |
|---|---|---|---|
| JOB01 | JOB01_20160525 | Chart01 | data01_20160525 |
| JOB01 | JOB01_20160530 | Chart01 | data01_20160530 |
| JOB01 | JOB01_20160620 | Chart01 | data01_20160620 |
| JOB02 | JOB02_20160526 | Chart01 | data02_20160526 |
| JOB02 | JOB02_20160630 | Chart01 | data02_20160630 |
| JOB03 | JOB03_20160601 | Chart01 | data03_20160601 |
| JOB03 | ... | Chart01 | ... |
| JOB04 | JOB04_20160601 | Chart02 | data04_20160601 |
| JOB04 | ... | Chart02 | ... |
| JOB05 | JOB05_20160615 | Chart02 | data05_20160615 |
| JOB05 | ... | Chart02 | ... |

IMAGE FORMING APPARATUS, IMAGE FORMING SYSTEM, AND NON-TRANSITORY RECORDING MEDIUM STORING A COMPUTER READABLE PROGRAM

CROSS-REFERENCE TO RELATED APPLICATIONS

The entire disclosure of Japanese Patent Application No. 2016-158406 filed on Aug. 12, 2016 including description, claims, drawings, and abstract are incorporated herein by reference in its entirety.

BACKGROUND OF THE INVENTION

Field of the Invention

The present invention relates to an image forming apparatus, an image forming system, and a non-transitory recording medium storing a computer readable program.

Description of the Related Art

In electrophotographic image forming apparatuses, since color reproducibility may change, patches of standard colors of FORGA, GRACol, JapanColor, or the like are formed, and color differences between the colorimetrical values of the patches and the standard colors are verified.

Sometimes, with respect to colors regarded as important, color sample images generated by colorimetrical values and color sample images generated by original color values are provided as sample pages such that it is possible to compare color variations (see, e.g., JP 2015-146490 A).

Some image forming apparatuses have a job storing function of storing images printed once such that it is possible to reprint those images. After images are stored, a change in color reproducibility may cause large color differences between printouts produced by reprinting the images and printouts produced for the first time during image storing, resulting in a lot of waste paper.

Although the possibility of verifying color differences in advance is desirable, it is impossible to grasp how large a color difference is between the time of image storing and the time of reprinting because color verification is usable only to check color differences from standard colors. For example, even if it is determined that a color difference from a standard color at an image storing timing is 5 and a color difference from the standard color at a reprinting timing is 5, it cannot be simply said that 10 which is the sum of those color differences is the color difference between the image storing timing and the reprinting timing.

Also, if a profile for color management is updated between the time of image storing and the time of reprinting accurate color verification becomes difficult because reproducibility of standard colors changes between the time of storing timing and the time of reprinting.

Although it is possible to produce a color sample by forming patches of standard colors at the time of image storing and use the color sample in color verification at the time of reprinting, in some storage environments, the color sample discolors, so accurate color verification is difficult. Also, the color sample may be lost.

SUMMARY OF THE INVENTION

An object of the present invention is to acquire a color difference between the time of image storing and the time of reprinting before reprinting.

To achieve the abovementioned object, according to an aspect, an image forming apparatus of Item 1 reflecting one aspect of the present invention comprises: an image generating unit configured to generate a job image by a rasterizing process; a color verification image generating unit configured to generate a color verification image including patches of a plurality of colors; a color converting unit configured to perform the same color converting process on the job image and the color verification image; a printing unit configured to print the job image and the color verification image subjected to the color converting process; a colorimetry device configured to measure the colors of the individual patches of a printout obtained by printing the color verification image; a storage unit; a storing control unit configured to store in the storage unit the job image subjected to the color converting process in association with the color verification image subjected to the color converting process, and colorimetrical values obtained from the color verification image; and a reprinting control unit configured to control reprinting of the job image stored in the storage unit, wherein the printing unit performs a test print of the color verification image stored in the storage unit in association with the job image, before reprinting the job image stored in the storage unit, and the colorimetry device measures the colors of the individual patches of a printout obtained by performing the test print of the color verification image, and the reprinting control unit compares colorimetrical values obtained during the test print by the colorimetry device with past colorimetrical values stored in the storage unit in association with the stored job image, and outputs color differences for determining whether to perform reprinting.

According to an invention of Item 2, the image forming apparatus of Item 1 further comprises a display unit, wherein the reprinting control unit controls the display unit such that the display unit displays the color differences.

According to an invention of Item 3, the image forming apparatus of Item 2 further comprises a manipulation unit, wherein, in response to a reprinting instruction of a user input by the manipulation unit, the reprinting control unit controls the printing unit such that the printing unit reprints the stored job image.

According to an invention of Item 4, in the image forming apparatus of Item 1 or 2, in a case where the color differences are allowable values set in advance, the reprinting control unit controls the printing unit such that the printing unit reprints the stored job image.

According to an invention of Item 5, the image forming apparatus of Item 2 further comprises a manipulation unit, wherein there are provided a manual option for determining whether to perform reprinting on the basis of a user's reprinting instruction and an automatic option for determining whether to perform reprinting on the basis of whether color differences are allowable values set in advance, regardless of a user's instruction, and in a case where the manual option is selected by the manipulation unit, in response to a user's reprinting instruction input by the manipulation unit, the reprinting control unit controls the printing unit such that the printing unit reprints the stored job image, and in a case where the automatic option is selected by the manipulation unit, the reprinting control unit determines whether the color differences are allowable values set in advance, and if the color differences are allowable values, the reprinting control unit controls the printing unit such that the printing unit reprints the stored job image.

According to an invention of Item 6, in the image forming apparatus of any one of Items 1 to 5, the reprinting control unit calculates at least one of a color difference, a lightness difference, and a hue difference between a colorimetrical value of a blank part of a sheet extracted from the past colorimetrical values and a colorimetrical value of a blank part of a sheet extracted from the colorimetrical values obtained during the test print, and in a case where at least one of the color difference, the lightness difference, and the hue difference calculated exceeds a threshold, the reprinting control unit notifies that there is a possibility that the sheet used in the test print is different from the sheet used at the time of storing the job image.

According to an invention of Item 7, in the image forming apparatus of any one of Items 1 to 6, the color verification image includes a media wedge defined by a standard, as patches of a plurality of standard colors.

According to an invention of Item 8, in the image forming apparatus of any one of Items 1 to 7, the color verification image includes patches of one or more specific colors designated by a user, or/and patches of one or more specific colors frequently appearing in the job image.

According to an invention of Item 9, in the image forming apparatus of any one of Items 1 to 8, the color verification image generating unit generates the same color verification image for a plurality of job images, and when storing each of the job images, the storing control unit stores in the storage unit the same color verification image and colorimetrical values obtained from the color verification image, and from the colorimetrical values obtained from the same color verification image and stored in the storage unit in association with the individual job images, the reprinting control unit selects colorimetrical values to be used in comparison with the colorimetrical values obtained during the test print.

According to an invention of Item 10, in the image forming apparatus of any one of Items 1 to 8, in a case where the job image is regenerated by the image generating unit, when the storing control unit restores the job image, it stores the corresponding job image in association with a color verification image regenerated by the color verification image generating unit together with the corresponding job image and colorimetrical values obtained from the color verification image, and from colorimetrical values stored in the storage unit in association with the individual job images by performing job image storing a plurality of times, the reprinting control unit selects colorimetrical values to be used in comparison with the colorimetrical values obtained during the test print.

According to an invention of Item 11, the image forming apparatus of any one of Items 1 to 10 further comprises a communication unit configured to transfer the job image stored in the storage unit together with the color verification image and the colorimetrical values stored unit in association with the job image to another image forming apparatus.

To achieve the abovementioned object, according to another aspect, an image forming system of Item 12 reflecting one aspect of the present invention comprises: an image generating unit configured to generate a job image by a rasterizing process; a color verification image generating unit configured to generate a color verification image including patches of a plurality of colors; a color converting unit configured to perform the same color converting process on the job image and the color verification image; a printing unit configured to print the job image and the color verification image subjected to the color converting process; a colorimetry device configured to measure the colors of the individual patches of a printout obtained by printing the color verification image; a storage unit; a storing control unit configured to store in the storage unit the job image subjected to the color converting process in association with the color verification image subjected to the color converting process and colorimetrical values obtained from the color verification image; and a reprinting control unit configured to control reprinting of the job image stored in the storage unit, wherein, before reprinting the job image stored in the storage unit, the printing unit performs a test print of the color verification image stored in the storage unit in association with the job image, and the colorimetry device measures the colors of the individual patches of a printout obtained by performing the test print of the color verification image, and the reprinting control unit compares colorimetrical values obtained during the test print by the colorimetry device with past colorimetrical values stored in the storage unit in association with the stored job image, and outputs color differences for determining whether to perform reprinting.

According to an invention of Item 13, in the image forming system of Item 12, the reprinting control unit calculates at least one of a color difference, a lightness difference, and a hue difference between a colorimetrical value of a blank part of a sheet extracted from the past colorimetrical values and a colorimetrical value of a blank part of a sheet extracted from the colorimetrical values obtained during the test print, and in a case where at least one of the color difference, the lightness difference, and the hue difference calculated exceeds a threshold, the reprinting control unit notifies that there is a possibility that the sheet used in the test print is different from the sheet used at the time of storing the job image.

According to an invention of Item 14, in the image forming system of Item 12 or 13, the color verification image includes patches of one or more specific colors designated by a user, or/and patches of one or more specific colors frequently appearing in the job image.

According to an invention of Item 15, in the image forming system of any one of Items 12 to 14, the color verification image generating unit generates the same color verification image for a plurality of job images, and when storing each of the job images, the storing control unit stores in the storage unit the same color verification image and colorimetrical values obtained from the color verification image, and from the colorimetrical values obtained from the same color verification image and stored in the storage unit in association with the individual job images, the reprinting control unit selects colorimetrical values to be used in comparison with the colorimetrical values obtained during the test print.

According to an invention of Item 16, in the image forming system of any one of Items 12 to 14, in a case where the job image is regenerated by the image generating unit, when the storing control unit restores the job image, it stores the corresponding job image in association with a color verification image regenerated by the color verification image generating unit together with the corresponding job image and colorimetrical values obtained from the color verification image, and from colorimetrical values stored in the storage unit in association with the individual job images by performing job image storing a plurality of times, the reprinting control unit selects colorimetrical values to be used in comparison with the colorimetrical values obtained during the test print.

To achieve the abovementioned object, according to a further aspect, a program of a non-transitory recording medium of Item 17 reflecting one aspect of the present invention makes a computer perform the following: a process of generating a job image by a rasterizing process; a process of generating a color verification image including patches of a plurality of colors; a process of performing the same color converting process on the job image and the color verification image; a process of printing the job image and the color verification image subjected to the color converting process by a printing unit; a process of measuring the colors by a colorimetry device of the individual patches of a printout obtained by printing the color verification image; a process of storing in a storage unit the job image subjected to the color converting process in association with the color verification image subjected to the color converting process, and colorimetrical values obtained from the color verification image; and a process of performing a test print of the color verification image stored in the storage unit in association with the job image by the printing unit, before reprinting the job image stored in the storage unit; a process of measuring the colors of the individual patches of a printout obtained by performing the test print of the color verification image by the colorimetry device; and a process of comparing colorimetrical values obtained during the test print by the colorimetry device with past colorimetrical values stored in the storage unit in association with the stored job image and outputting color differences for determining whether to perform reprinting.

According to an invention of Item 18, the program of Item 17 makes the computer further perform: a process of calculating at least one of a color difference, a lightness difference, and a hue difference between a colorimetrical value of a blank part of a sheet extracted from the past colorimetrical values and a colorimetrical value of a blank part of a sheet extracted from the colorimetrical values obtained during the test print; and a process of notifying that there is a possibility that the sheet used in the test print is different from the sheet used at the time of storing the job image, in a case where at least one of the color difference, the lightness difference, and the hue difference calculated exceeds a threshold.

According to an invention of Item 19, in the program of Item 17 or 18, the color verification image includes patches of one or more specific colors designated by a user, or/and patches of one or more specific colors frequently appearing in the job image.

According to an invention of Item 20, in the program of any one of Items 17 to 19, in the process of generating the color verification image, the same color verification image is generated for a plurality of job images, and in the process of storing the job image, the same color verification image and colorimetrical values obtained from the color verification image are stored in the storage unit in association with each of the job images, and in the process of outputting the color differences, from the colorimetrical values obtained from the same color verification image and stored in the storage unit in association with the individual job images, colorimetrical values to be used in comparison with the colorimetrical value obtained during the test print are selected.

According to an invention of Item 21, the program of any one of Items 17 to 19 makes the computer further perform a process of regenerating the job image and the color verification image, and performing the same color converting process on them, and printing the job image and the color verification image subjected to the color converting process, and measuring the colors of them, and restoring the job image regenerated and subjected to the color converting process in the storage unit in association with the color verification image regenerated and subjected to the color converting process and colorimetrical values obtained from the regenerated color verification image, wherein in the process of outputting color differences, from the colorimetrical values stored in the storage unit in association with the individual job images by performing job image storing a plurality of times, colorimetrical values to be used in comparison with the colorimetrical values obtained during the test print are selected.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Hereinafter, embodiments of an image forming apparatus, an image forming system, and a program of the present invention will be described with reference to the drawings.

Figure 1:
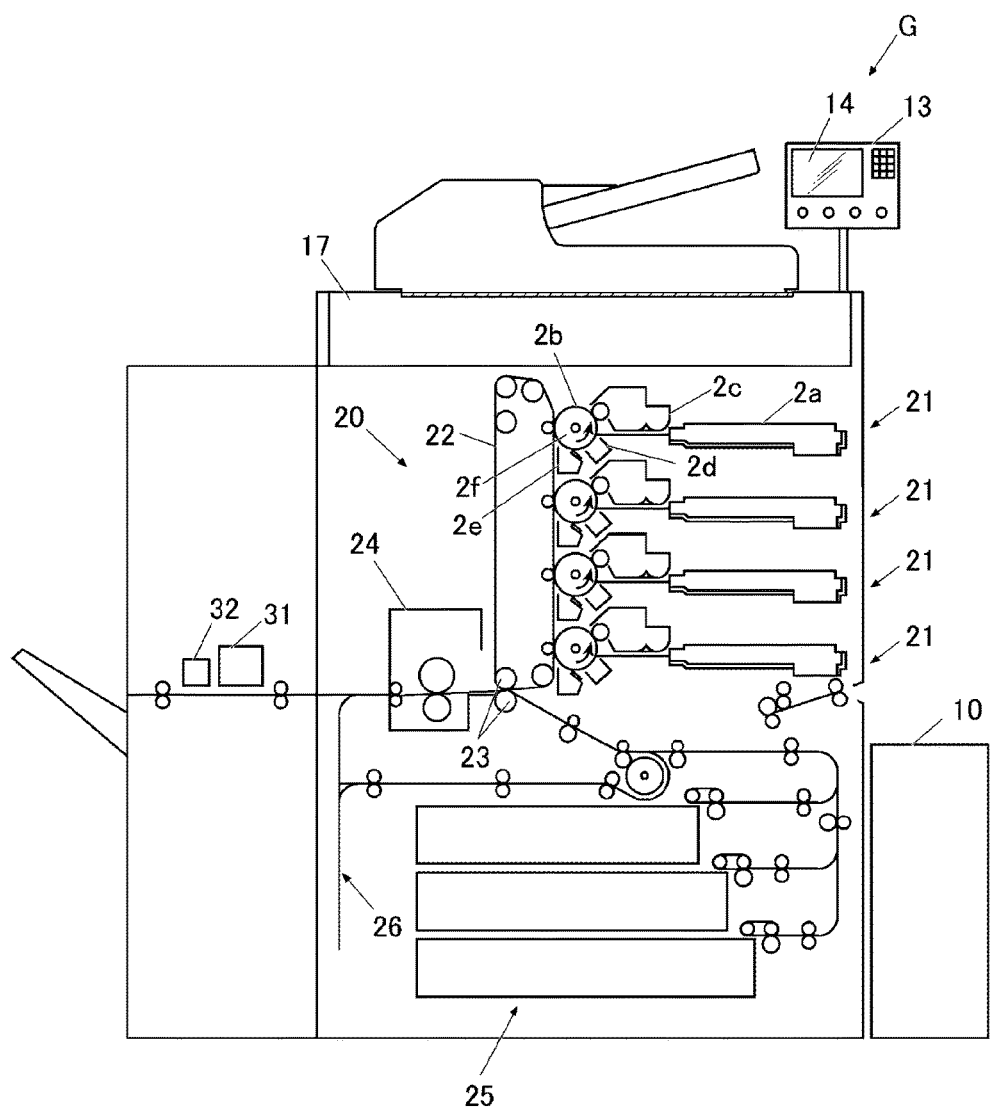
FIG. 1 is a front view illustrating a rough configuration of an image forming apparatus of an embodiment of the present invention.

FIG. 1 shows a rough configuration of an image forming apparatus G of an embodiment of the present invention.

As shown in FIG. 1, the image forming apparatus G includes a printing controller 10, an image reading unit 17, and a printing unit 20. The image forming apparatus G generates images which are bitmap data with the printing controller 10 or the image reading unit 17, and prints those images with the printing unit 20. A printing operation which is performed by the image forming apparatus G is referred to as a job, and a generated image is referred to as a job image.

Also, the image forming apparatus G includes a reading device 31 and a colorimetry device 32 on a part of a sheet transport path after printing.

Figure 2:
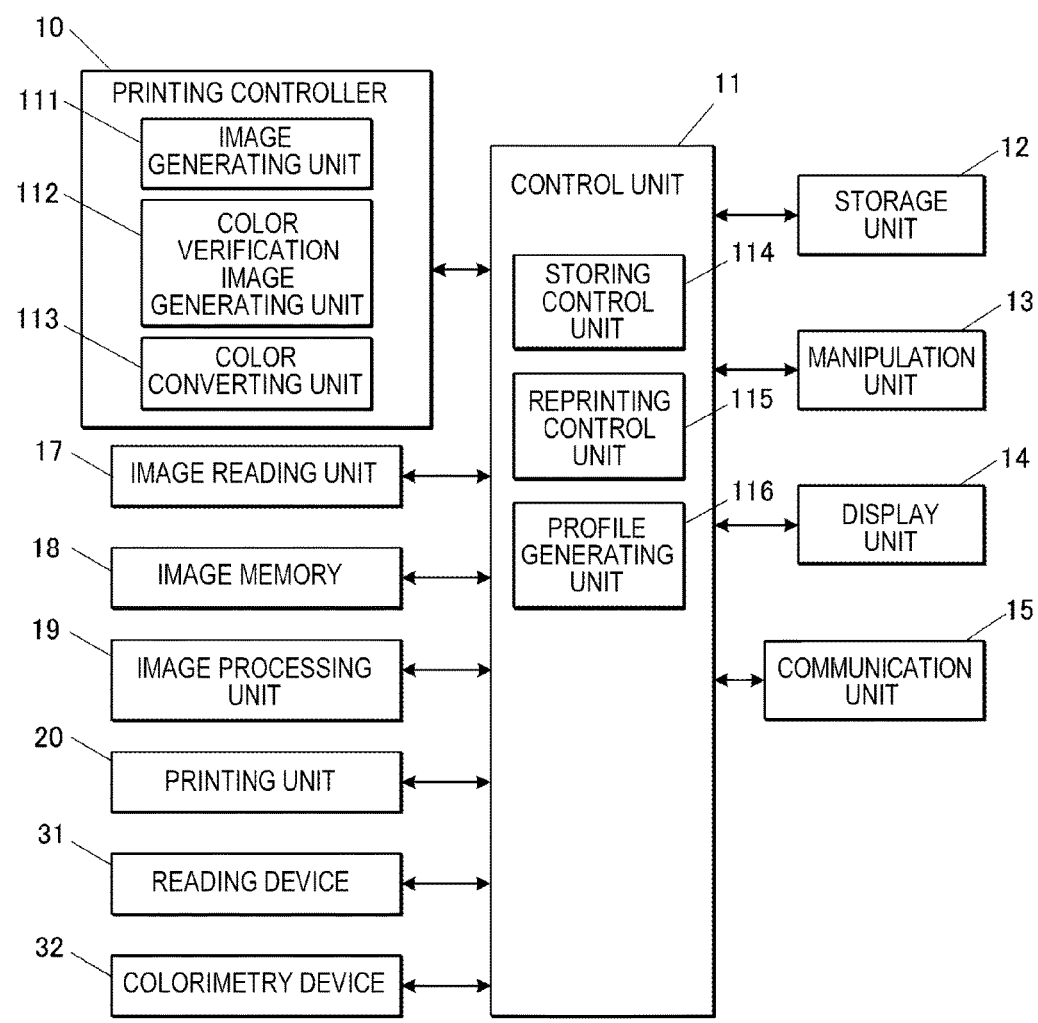
FIG. 2 is a block diagram illustrating individual functional components of the image forming apparatus.

FIG. 2 is a block diagram illustrating individual functional components of the image forming apparatus G.

As shown in FIG. 2, the image forming apparatus G includes the printing controller 10, a control unit 11, a storage unit 12, a manipulation unit 13, a display unit 14, a communication unit 15, the image reading unit 17, an image memory 18, an image processing unit 19, the printing unit 20, the reading device 31, and the colorimetry device 32.

As shown in FIG. 2, the printing controller 10 includes an image generating unit 111, a color verification image generating unit 112, and a color converting unit 113

The printing controller 10 is configured with a central processing unit (CPU), a random access memory (RAM), a read only memory (ROM), and so on, and the printing controller 10 can implement the processing contents of the image generating unit 111, the color verification image generating unit 112, and the color converting unit 113 by a software process of reading out programs and executing the programs.

The image generating unit 111 generates job images which are bitmap data, from data representing printing contents and described in a page description language (PDL) (hereinafter, referred to as PDL data), by a rasterizing process. In job images, individual pixels have pixel values of four colors, i.e., cyan (C), magenta (M), yellow (Y), and black (K). Pixel values are data values representing image tones; for example, 8-bit data values represent tones from 0 to 255.

The color verification image generating unit 112 generates color verification images, each including patches of a plurality of colors.

The color converting unit 113 performs a color converting process on job images generated by the image generating unit 111 using a profile for color management. Also, the color converting unit 113 performs the same color converting process as that on job images generated by the image generating unit 111, on color verification images generated by the color verification image generating unit 112.

In the color converting process, various profiles such as a profile for converting device-dependent color values or RGB, sRGB, CMYK, or the like into device-independent color values such of L*a*b*, XYZ, or the like and a profile for converting device-independent color values of L*a*b*, XYZ, or the like into device-dependent color values of CMYK of the printing unit 20 can be used. Each profile is a multidimensional look-up table defining input values and output values.

The control unit 11 is configured with a CPU, a RAM, and so on, and controls individual units by reading out various programs from the storage unit 12 and executing the programs.

For example, the control unit 11 controls the image processing unit 19 such that the image processing unit performs image processing on job images generated by the printing controller 10 or the image reading unit 17 and stored in the image memory 18, and controls the printing unit 20 such that the printing unit prints the job images subjected to the image processing.

Also, as shown in FIG. 2, the control unit 11 includes a storing control unit 114, a reprinting control unit 115, and a profile generating unit 116 for storing job images and reprinting stored job images. The processing contents of these units can be implemented by a software process of reading out programs and executing the programs.

The storing control unit 114 stores job images in the storage unit 12 in response to user's instructions.

Also, in association with each stored job image, the storing control unit 114 stores a color verification image generated together with the corresponding job image and the colorimetrical values of the corresponding color verification image in the storage unit 12.

The reprinting control unit 115 compares a colorimetrical value obtained by performing a test print of a color verification image stored in association with a job image and measuring the color of the printout before reprinting with a past colorimetrical value stored in association with the corresponding job image in the storage unit 12 and outputs a color difference for determining whether to perform reprinting.

The reprinting control unit 115 can control the display unit 14 such that the display unit displays color differences, and control the printing unit 20 such that the printing unit performs reprinting of stored job images in response to user's printing instructions input from the manipulation unit 13. Even if there is no user's printing instruction, if a color difference is a pre-set allowable value, the reprinting control unit 115 can control the printing unit 20 such that the printing unit reprints a stored job image.

The profile generating unit 116 generates and updates a profile to be used in color conversion by the color converting unit 113.

The storage unit 12 retains programs readable by the control unit 11, files usable when the programs are executed, and so on. Also, in the storage unit 12, job images, color verification images, colorimetrical values, and so on can be stored. As the storage unit 12, a capacious memory such as a hard disk can be used.

The manipulation unit 13 generates operation signals according to user's operations and outputs the operation signals to the control unit 11. As the manipulation unit 13, a keypad, a touch panel configured integrally with the display unit 14, and so on can be used.

The display unit 14 displays operation screens and so on in response to instructions of the control unit 11. As the display unit 14, a liquid crystal display (LCD), an organic electro luminescence display (OELD), and so on can be used.

The communication unit 15 performs communication with external devices on a network, such as a user terminal, a server, and other image forming apparatuses.

The communication unit 15 receives PDL data from the user terminal through the network.

As shown in FIG. 1, the image reading unit 17 includes an automatic original-document feeder, a scanner, and so on, and reads the surfaces of original documents set on an original-document platform, and generates job images which are bitmap data. In the job images generated by the image reading unit 17, individual pixels have pixel values of three colors of red (R), green (G), and blue (B). A color converting process of converting R, G, and B of the job images into C, M, Y, and K may be performed in the color converting unit 113, or may be performed in the control unit 11 in a case where the control unit 11 has the same function as that of the color converting unit 113.

The image memory 18 is a buffer memory for temporarily storing job images to be printed. As the image memory 18, a dynamic RAM (DRAM) and the like can be used.

The image processing unit 19 reads out job images from the image memory 18 and performs a variety of image processing such as layout processes like rotating, upsizing, downsizing, adding page numbers, integrating pages, a concentration correcting process, and a screen process of simulatively reproducing middle tones using dithering.

The printing unit 20 forms images comprising four colors, i.e., C, M, Y, and K on sheets, on the basis of the pixel values of four colors of individual pixels of job images subjected to image processing in the image processing unit 19.

As shown in FIG. 1, the printing unit 20 includes four writing units 21, an intermediate image transfer unit 22, secondary transfer rollers 23, a fixing device 24, and a sheet feed tray 25.

The four writing units 21 are arranged in series (tandem) along a belt surface of the intermediate image transfer unit 22 and forms images of the colors C, M, Y, and K, respectively. The individual writing units 21 have the same configuration except that they form images in different colors, respectively, and each include an optical scanning device 2a, a photoconductor 2b, a developing unit 2c, a charging unit 2d, a cleaning unit 2e, and a primary transfer roller 2f, as shown in FIG. 1.

During image forming, in the individual writing units 21, the photoconductors 2b are charged by the charging units 2d, and the photoconductors 2b are scanned with beams emitted from the optical scanning devices 2a on the basis of a job image, whereby electrostatic latent images are formed. The developing units 2c develop the electrostatic latent images by supplying colorants such as toner, whereby images are formed on the photoconductors 2b of the four writing units 21, respectively. These images are sequentially transferred (primarily transferred) onto the intermediate image transfer unit 22 by the primary transfer rollers 2f As a result, an image comprising the four colors is formed on the intermediate image transfer unit 22. After primary transferring, the colorants remaining on the photoconductors 2b are removed by the cleaning units 2e.

The printing unit 20 feeds a sheet from the sheet feed tray 25, transfers (secondarily transfers) the image from the intermediate image transfer unit 22 onto the sheet by the secondary transfer rollers 23, and performs a fixing process by heating while pressing the sheet by the fixing device 24.

In a case of forming images on both sides of a sheet, the printing unit transports the sheet to a transport path 26, thereby inverting the sheet, and transports the sheet toward the secondary transfer rollers 23 again.

The reading device 31 sequentially reads a surface of each sheet by a plurality of imaging devices such as charge coupled devices (CCDs) and outputs color values of a device-dependent color space, such as RGB.

As a reading device 31, various devices such as line sensors, area sensors, and digital cameras can be used.

The colorimetry device 32 measures the colors of surfaces of sheets and outputs color values of a device-independent color space, such as L*a*b* or XYZ.

As a colorimetry device 32, various devices such as a spectrophotometer for measuring colors by analyzing the intensity of reflected light of light radiated from a light source for each wavelength can be used.

Also, if the reading device 31 and the colorimetry device 32 are mounted on the transport path in the image forming apparatus G as shown in FIG. 1, it is easy to store colorimetrical values, and thus it is preferable; however, they may be external devices separate from the image forming apparatus G. In this case, color values obtained by the external reading device 31 and the external colorimetry device 32 may be transferred to the image forming apparatus G.

In a case of reprinting a stored job image, the above-described image forming apparatus G can obtain a color difference between the time of storing and the time of reprinting according to the following processing procedure before reprinting.

Figure 3:
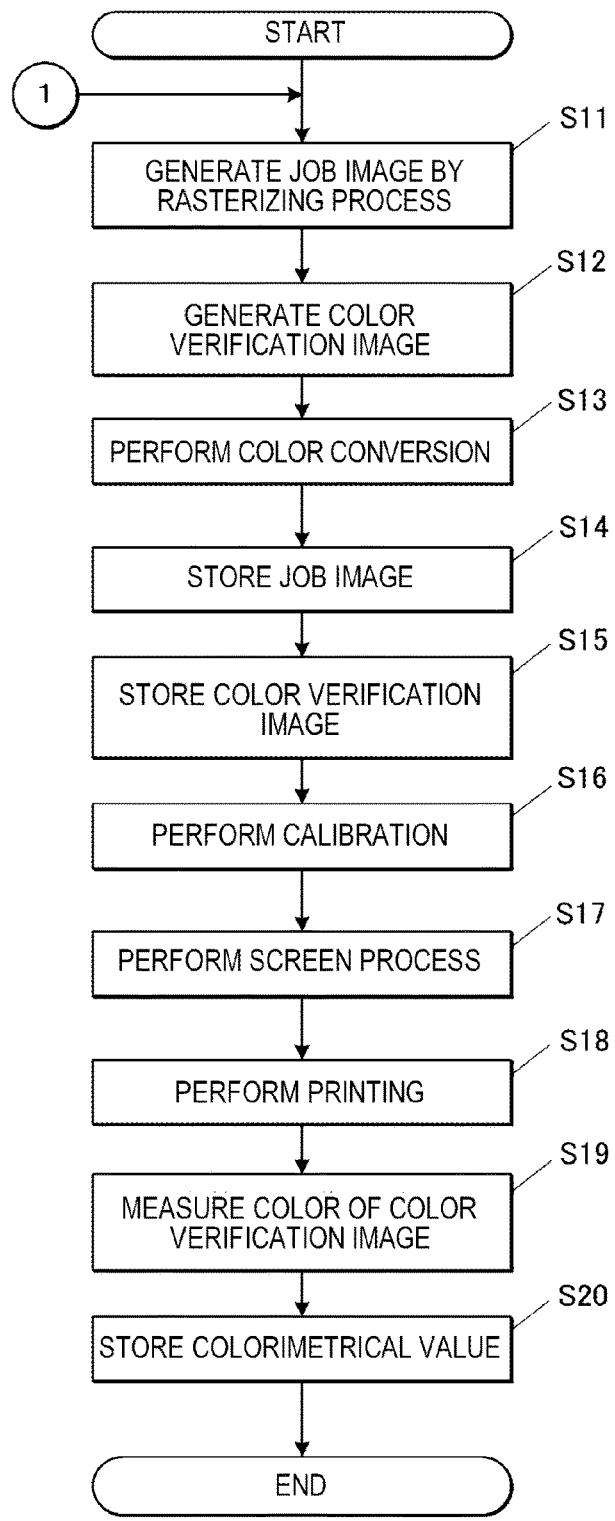
FIG. 3 is a flow chart illustrating the procedure of processing which is performed when a job image is stored.

FIG. 3 shows the procedure of processing which is performed when the image forming apparatus G stores a job image.

In the image forming apparatus G, as shown in FIG. 3, in STEP S11, the image generating unit 111 of the printing controller 10 generates a job image which is bitmap data, from PDL data, by a rasterizing process.

If the job image is generated, in STEP S12, the color verification image generating unit 112 generates a color verification image including patches of a plurality of colors. The color verification image generating unit 112 may generate the same color verification image for a plurality of job images, or may generate different color verification images for a plurality of job images, respectively.

A color verification image can include patches of a plurality of standard colors, and as such standard colors, a patch group called a media wedge defined by a standard such as FORGA, GRACol, or JapanColor can be used. Besides the media wedge, patches of a plurality of colors selected as the standard colors from colors distributed in a color gamut reproducible in the printing unit 20 can also be used.

Due to use of the standard colors, it is possible to generally verify colors included in the color gamut, and it is possible to improve the accuracy of color verification.

The color verification image can include patches of basic colors corresponding to grid points defined by the outline of the color gamut reproducible by the printing unit 20 and a gray axis extending at the center of the color gamut.

Due to use of the basic colors, it is possible to accurately estimate colorimetrical values from the color values of the standard colors on the basis of at least as many colorimetrical values (colorimetrical values obtained by the colorimetry device 32) as the colors and as many color values (color values obtained by the reading device 31) as the colors.

The color verification image can include at least either one or more colors designated by a user or one or more colors frequently appearing in the job image, as patches of specific colors, besides the standard colors and the basic colors. In this case, it is possible to improve the accuracy of color verification of important specific colors.

As examples of specific colors which are designated by the user, a flesh color or a skin color for which the user regards reproducibility of the corresponding color as important, a corporate color which is being used as a symbol of a company, and so on can be taken.

Specific colors frequently appearing in the job image can be determined by analyzing the job image. For example, the color verification image generating unit 112 may calculate the appearance frequencies of pixel values of each of the colors C, M, Y, and K by analyzing the job image, and determine one color having the highest appearance frequency as a specific color, or determine some colors in descending order of appearance frequency as specific colors.

Figure 4:
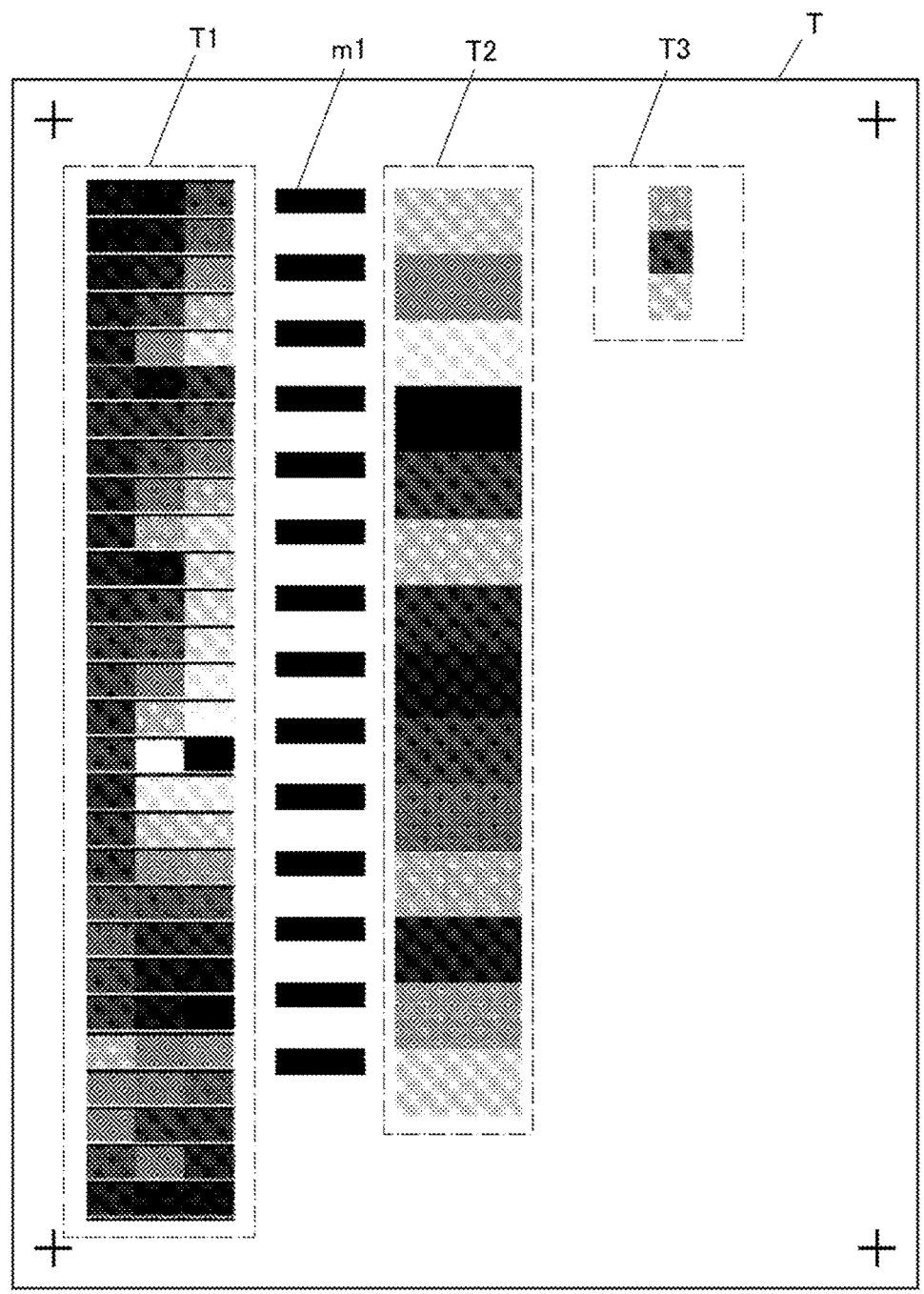
FIG. 4 is a view illustrating an example of a color verification image.

FIG. 4 shows an example of the color verification image.

As shown in FIG. 4, a color verification image T includes a standard-color patch group T1, a basic-color patch group T2, and a specific-color patch group T3. Also, a mark m1 adjacent to the basic-color patch group T2 is a mark for showing the positions of individual patches of the patch group T2. Crosses shown at four corners of the color verification image T are marks for alignment.

The user can arbitrarily add patches of specific color in the color verification image.

Figure 5:
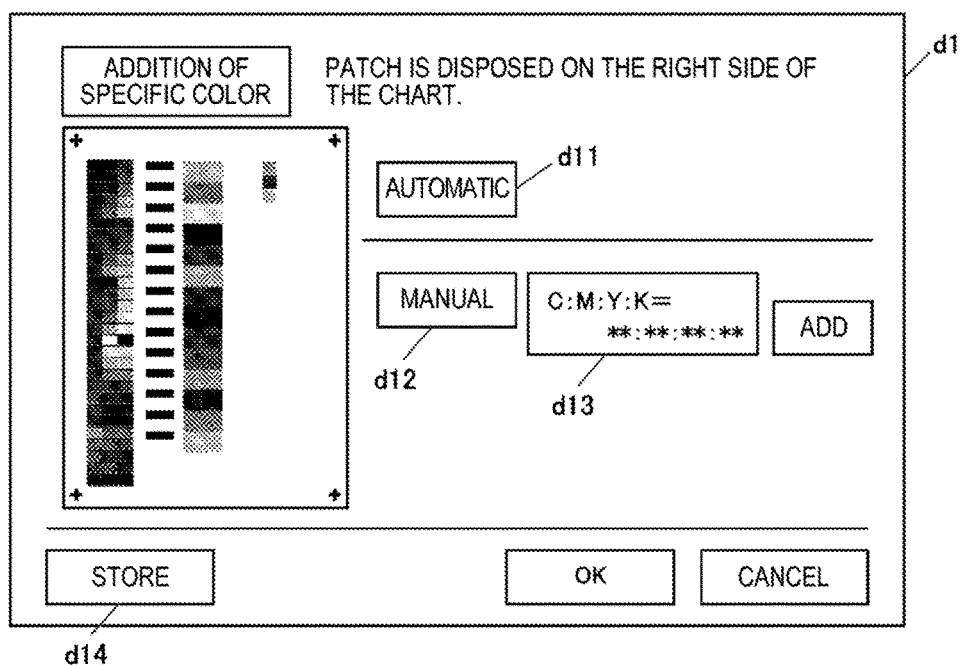
FIG. 5 is a view illustrating an example of an operation screen for adding a specific color.

FIG. 5 shows an example of an operation screen for adding specific colors.

As shown in FIG. 5, in an operation screen d1, an automatic button d11 and a manual button d12 are displayed. In a case where the user operates the automatic button d11 using the manipulation unit 13, as described above, the color verification image generating unit 112 determines one or more colors frequently appearing in the job image, as specific colors, by analyzing the job image, and adds a patch of each specific color in the color verification image. In a case where the user operates the manual button d12, the color verification image generating unit 112 determines each color designated by the user and defined by the values of the colors C, M, Y, and K input to an input field d13, as a specific color, and adds a patch of the corresponding specific color in the color verification image.

If a job storing button d14 displayed in the operation screen d1 is operated, the processing procedure shown in FIG. 2 starts so as to generate a color verification image including specific colors added on the operation screen d1 during generation of a job image.

Subsequently, in STEP S13, in order to manage colors, the color converting unit 113 performs the same color converting process on the job image generated by the image generating unit 111 and the color verification image generated by the color verification image generating unit 112. Specifically, the color converting unit can perform the same color converting process by converting the pixel values of the colors C, M, Y, and K of the job image and the color verification image using the same color management profile. For example, in a case of using an ICC profile, the color converting unit performs conversion from CMYK into L*a*b*, and then performs conversion from L*a*b* into C'M'Y'K'.

In STEP S14, the storing control unit 114 stores in the storage unit 12 the job image obtained by performing the color converting process with the color converting unit 113. At this time, the unrasterized PDL data obtained for generating the job image may be stored together such that it is possible to perform the rasterizing process on the PDL data again, thereby regenerating the job image before the color converting process.

Also, in STEP S15, the storing control unit 114 stores in the storage unit 12 the color verification image subjected to the color converting process in association with the stored job image.

Meanwhile, in STEP S16, the image forming apparatus G performs calibration of the printing unit 20. During calibration, in the printing unit 20, reference patches such as a patch having the highest concentration and gradation patches are formed on the intermediate image transfer unit 22, and image forming conditions, such as the laser power of laser beams to be radiated by the optical scanning devices 2a during exposure, and the bias voltage of the developing units 2c, are adjusted on the basis of the detection values of the concentrations of the reference patches such that the concentration of an image becomes a desired concentration.

After calibration finishes, in STEP S17, the storing control unit 114 outputs the job image and the color verification image subjected to the color converting process and stored in the storage unit 12 to the image memory 18, and the image processing unit 19 reads out the job image and the color verification image from the image memory 18 and performs a screen process on them. In STEP S18, the printing unit 20 prints the job image subjected to the screen process and prints the color verification image subjected to the screen process.

If the color verification image is formed on a sheet by printing in STEP S19, the colorimetry device 32 measures the colors of the individual patches of the color verification image.

Unlike the reading device 31 having an array of the imaging devices and capable of reading the whole surface of each sheet, the colorimetry device 32 is likely to be able to measure only the color of a limited part of the surface of each sheet which is a spot area. A plurality of the colorimetry devices 32 may be disposed such that it is possible to measure the color of every patch by the colorimetry devices 32, or a scanner profile generated by measuring the colors of some of the standard colors or the basic colors may be used to obtain the colorimetrical value of every patch.

Specifically, all of the standard color patch group T1, the basic-color patch group T2, and the specific-color patch group T3 included in the color verification image T shown in FIG. 4 are read by the reading device 31, and only the color of the basic-color patch group T2 is measured by the colorimetry device 32. In this case, the position of each patch of the patch group T2 to be subjected to color measurement of the colorimetry device 32 may be determined by detecting the mark m1. The profile generating unit 116 generates a scanner profile for converting RGB color values into L*a*b* color values using the RGB color values of the basic-color patch group T2 obtained by the reading device 31 and the L*a*b* color values of the same patch group T2 obtained by the colorimetry device 32. If the color converting unit 113 converts the RGB color values of the standard color patch group T1 and the specific-color patch group T3 obtained by the reading device 31 into L*a*b* color values, using the scanner profile, even if all patches are not read by the colorimetry device 32, it is possible to obtain color values of the same color space L*a*b* as that used during color measurement of the colorimetry device 32, using as many patches as the colors.

In STEP S20, the storing control unit 114 stores in the storage unit 12 the colorimetrical values obtained by the colorimetry device 32 in association with the job image. Also, the colorimetrical values obtained with the colorimetry device 32 include not only colorimetrical values obtained by actually measuring colors by the colorimetry device 32 but also colorimetrical values obtained by performing color conversion using the scanner profile on the color values obtained by the reading device 31 as described above.

Figure 6:
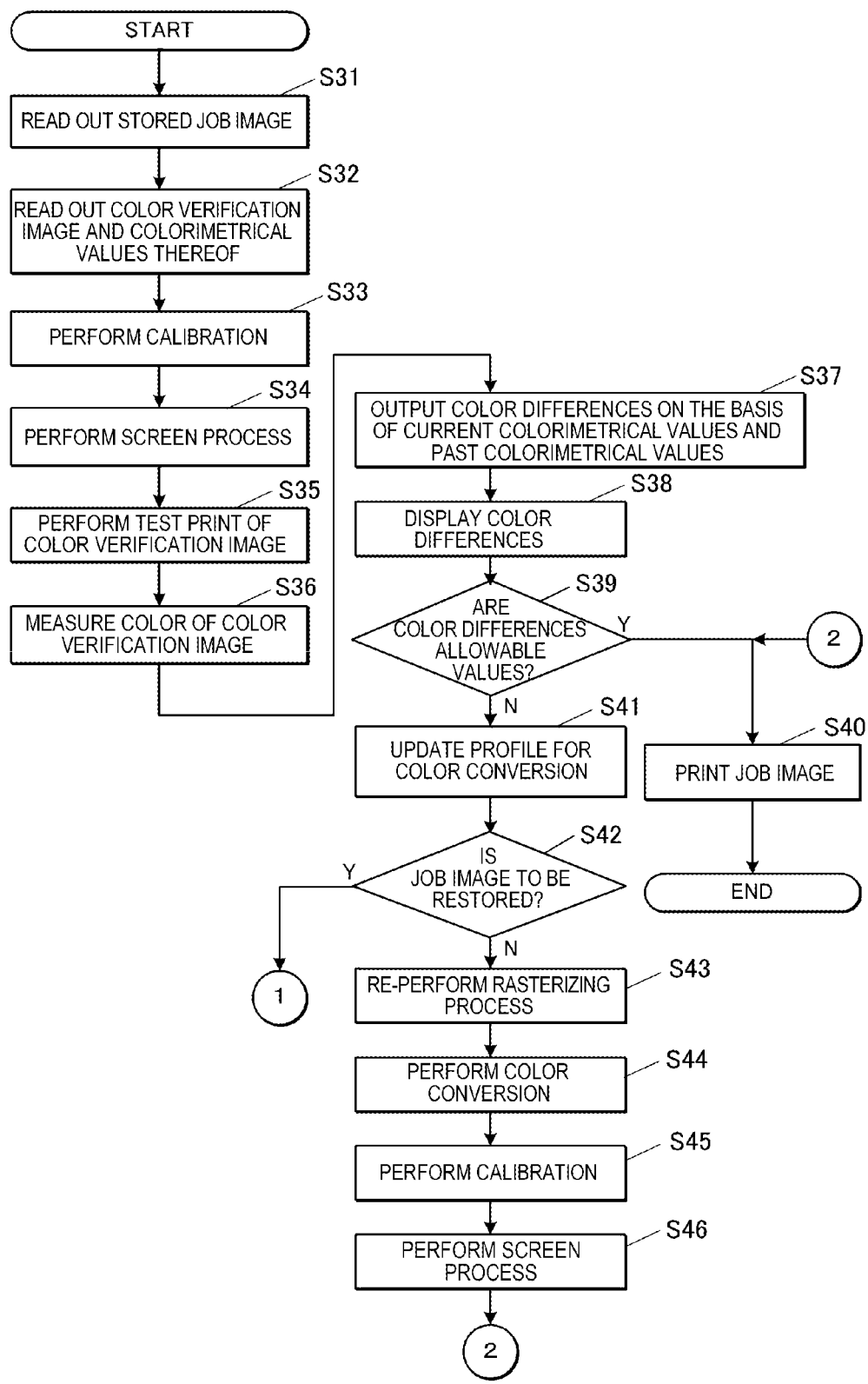
FIG. 6 is a flow chart illustrating the procedure of processing which is performed for reprinting.

FIG. 6 shows the procedure of processing which is performed when the image forming apparatus G reprints a stored job image.

During reprinting, in the image forming apparatus G, as shown in FIG. 6, in STEP S31, the storing control unit 114 reads out a job image stored in the storage unit 12. Also, in STEP S32, the storing control unit 114 reads out a color verification image associated with the read job image and the colorimetrical values of the color verification image from the storage unit 12.

Subsequently, in STEP S33, in the image forming apparatus G, calibration of the printing unit 20 is preformed in the same way as that at the time of storing the job image. After calibration, in STEP S34, the storing control unit 114 outputs the read job image and the read color verification image to the image memory 18, and the image processing unit 19 reads out the job image and the color verification image from the image memory 18 and performs a screen process on them. In STEP S35, the printing unit 20 first performs a test print of only the color verification image subjected to the screen process before reprinting the job image.

If the color verification image is formed on a sheet by the test print in STEP S36, the colorimetry device 32 measures the color of each patch of the color verification image. Even in this case, as described above, a scanner profile may be generated by reading out the color verification image by the reading device 31 and be used to perform color conversion on the color values obtained by the reading device 31, thereby obtaining the colorimetrical value of every patch.

In STEP S37, the reprinting control unit 115 compares the colorimetrical values obtained during the current test print by the colorimetry device 32 with the past colorimetrical values read out together with the job image from the storage unit 12 by the storing control unit 114 and outputs a color difference for determining whether to perform reprinting. In a case of colorimetrical values of L*a*b*, on the basis of the lightness differences ΔL* and hue differences Δa* and Δb* between the past and the current, the color difference ΔE of each patch can be calculated by the following expression.

$$\Delta E = \{(\Delta L^*)^2 + (\Delta a^*)^2 + (\Delta b^*)^2\}^{1/2}$$

As color differences, the average color difference, maximum color difference, and so on of each patch can be output, and also the average color difference, maximum color difference, and so on of each of the standard color section, the basic color section, and the specific color section can be output.

Also, as a color difference, $\Delta E_{00}$ can be calculated.

In STEP S38, the reprinting control unit 115 controls the display unit 14 such that the control unit displays the output color difference as a color verification result.

Figure 7:
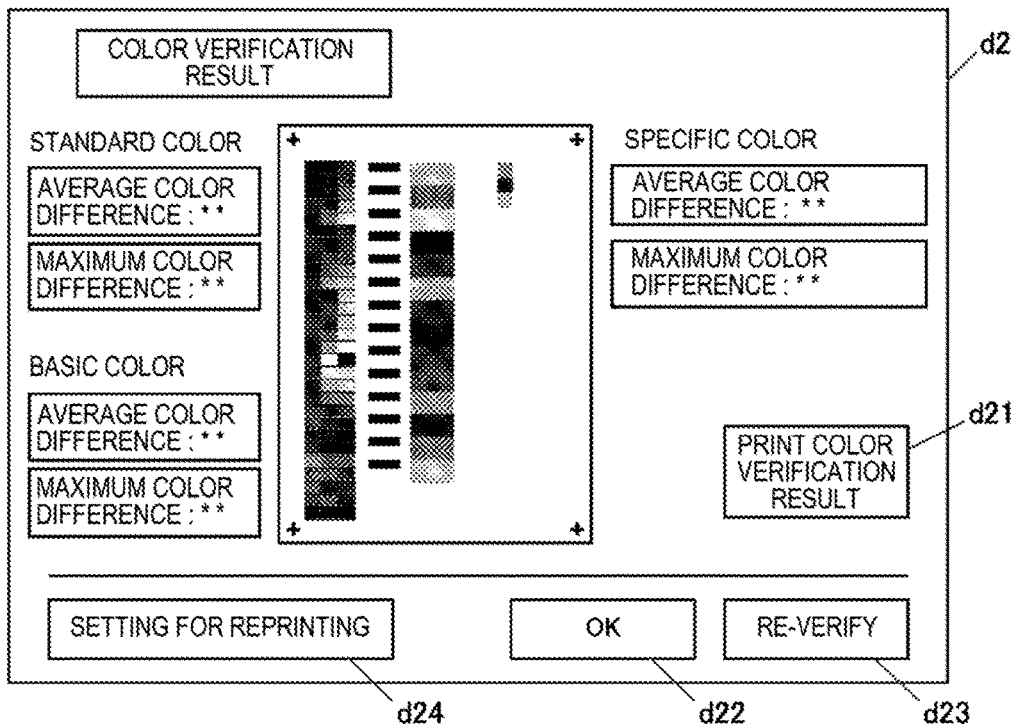
FIG. 7 is a view illustrating an example of an operation screen which is displayed when a color verification result is displayed.

FIG. 7 shows an example of an operation screen which is displayed when a color verification result is displayed.

As shown in FIG. 7, in an operation screen d2, the average color difference maximum color difference, and so on of each of the standard color section, the basic color section, and the specific color section are displayed.

If a print button d21 displayed on the operation screen d2 is operated, the printing unit 20 prints all of the colorimetrical values of the individual patches obtained at the current time (during the test print), as a color verification result. The colorimetrical values of the individual patches obtained in the past (at the job image storing timing) may be also printed together. The user can check the details of the color verification result on the basis of the printed colorimetrical values.

In a case of performing color verification again, the user needs only to operate a re-verification button d23. In response to the operation on the re-verification button d23, the image forming apparatus G re-performs the processing procedure from the test print of STEP S35.

In a case where it is determined as the result of checking on the color verification result that the color differences are allowable values allowing reprinting, in order to instruct reprinting of the job image, the user needs only to operate an OK button d22 on the operation screen d2.

Whether to perform reprinting on the basis of the color differences may be determined in response to a user's instruction using the OK button d22, or may be determined in the image forming apparatus G regardless of a user's instruction, or the former and the latter may be set as a manual option and an automatic option, respectively, such that the user can select any one option. In the operation screen d2, a setting button d24 for reprinting can be operated to select either the manual option or the automatic option.

Figure 8:
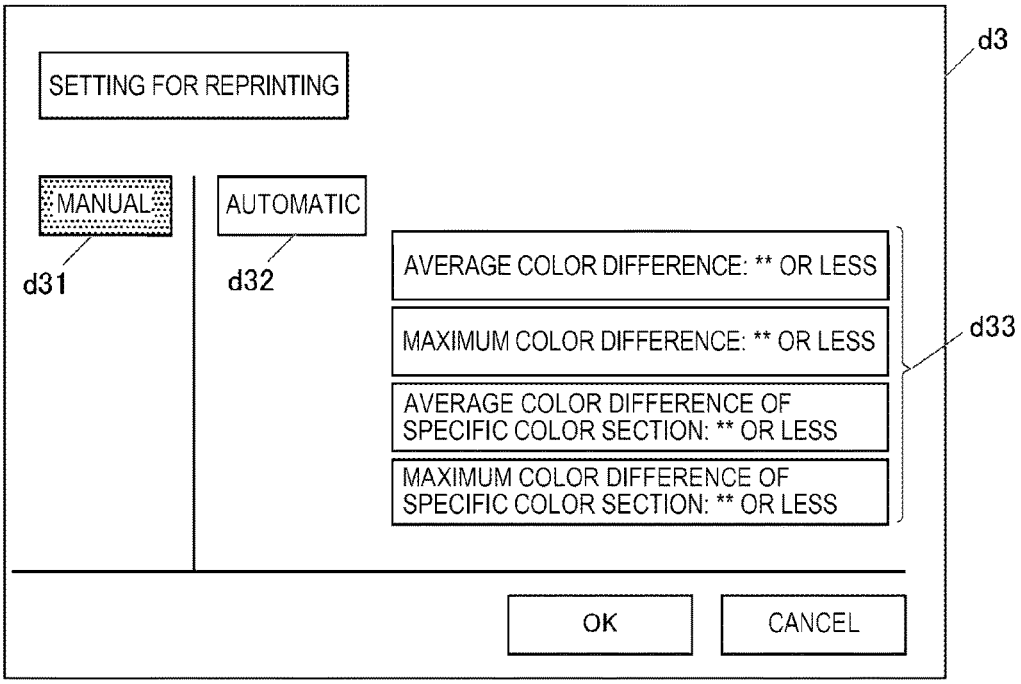
FIG. 8 is a view illustrating an example of an operation screen for selecting an option for reprinting.

FIG. 8 shows an example of an operation screen for selecting an option for reprinting.

In an operation screen d3, a manual button d31 can be operated to select the manual option, and an automatic button d32 can be operated to select the automatic option. In the automatic option, the user can set conditions for reprinting by inputting allowable values for color differences as conditions for reprinting in an input field d33. Also, in the automatic option, the above-mentioned color verification result does not necessarily need to be displayed, and may be displayed only in response to an instruction from the user.

After the color differences are output, in STEP S39, the reprinting control unit 115 determines whether the output color differences are allowable values. In the manual option, in a case where the user operates the OK button d22 on the operation screen d2, thereby inputting a reprinting instruction, the reprinting control unit 115 determines that the color differences are allowable values. In the automatic option, in a case where the output color differences coincide with the allowable values for color differences input in the input field d33 of the operation screen d3 and set in advance, the reprinting control unit 115 determines that the color differences are allowable values.

In a case where the color differences are allowable values ("Y" in STEP S39), the reprinting control unit 115 instructs the printing unit 20 to reprint the job image. In STEP S40, the printing unit 20 prints the job image subjected to the screen process with the image processing unit 19.

In a case where any color difference is not an allowable value ("N" in STEP S39) in STEP S41, the profile generating unit 116 updates the profile to be used in color conversion of the color converting unit 113 for color management. For example, it is possible to generate a profile for converting L*a*b* into CMYK, using color values of L*a*b* obtained by printing a color chart by the printing unit 20, without performing color conversion using a profile and measuring the colors of the individual patches on the sheet with the colorimetry device 32 and the CMYK color values of the individual patches.

In a case where the job image is restorable and is restored ("Y" in STEP S42), the image forming apparatus proceeds to the process of STEP S11 shown in FIG. 3 and repeats the processing procedure shown in FIG. 3. In other words, the image generating unit 111 regenerates a job image by performing a rasterizing process again, and the color verification image generating unit 112 regenerates a color verification image. The color converting unit 113 performs the same color converting process using the updated profile on the regenerated job image and the regenerated color verification image, and the printing unit 20 prints the color verification image, and the colorimetry device 32 measures the colors of the color verification image. Subsequently, the storing control unit 114 restores the regenerated job image subjected to the color converting process in association with the regenerated color verification image and the colorimetrical values of the regenerated color verification image. At this time, the storing control unit 114 restores the regenerated job image as a job image obtained by the same job as that of the job image stored at the previous time in a separate file at storage date and time different from that of the job image stored at the previous time.

Figures 9, 10:
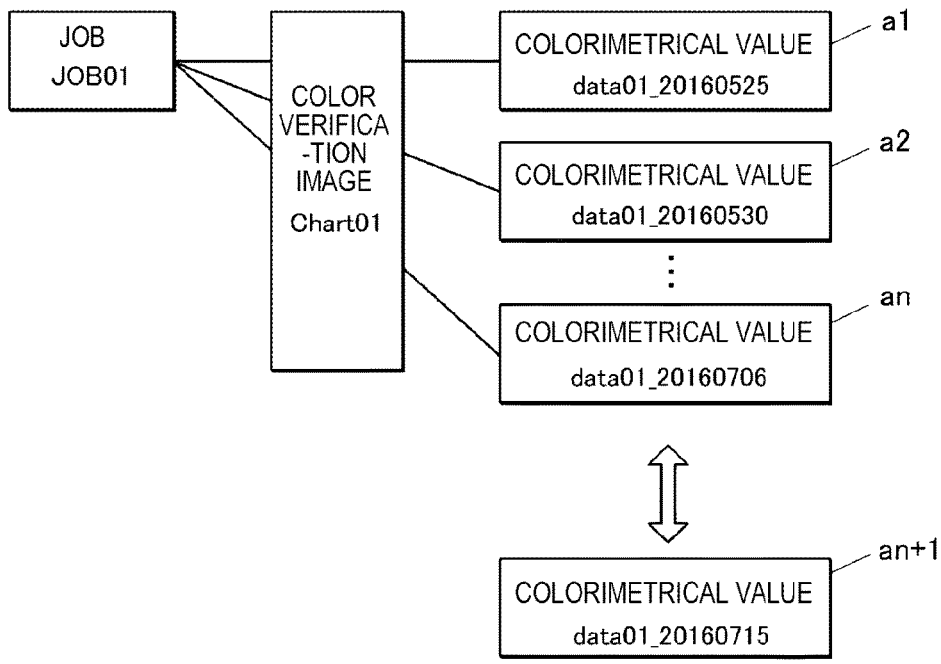
FIG. 9 is a view illustrating a job image storage example.
FIG. 10 is a view illustrating n-number of past colorimetrical values comparable with a current colorimetrical value.

FIG. 9 shows a job image storage example.

As shown in FIG. 9, job images obtained from the original PDL data are stored with the same job identification number and different file names so as to be distinguished from one another. For example, in a job having an identification number "JOB01", job image storing has been performed three times, and thus three job images have been stored. The individual job images have file names which are combinations of storage dates and times with the same job identification number "JOB01" so as to be distinguished from one another.

In association with each of the stored job images, the file name of a color verification image generated together with the corresponding job image and data on the colorimetrical values of the color verification image have been stored. In a case where the same color verification image has been generated for a plurality of job images, regardless of whether the plurality of job images have obtained by the same job or by different jobs, the same color verification image has been associated with the plurality of job images. For example, as shown in FIG. 9, since jobs having identification numbers "JOB01" and "JOB02" have been obtained by different jobs but the same color verification image has been generated, the same color verification image having an identification number "Chart01" has been associated.

Although the same color verification image has been generated, since the colorimetrical values of the color verification image have been obtained during storing of each job image, the colorimetrical values obtained during storing of each job image have been associated with the corresponding job image. For example, in association with a job image "JOB01_20160530" stored on May 30, 2016, colorimetrical values "data01_20160530" of a color verification image printed at the storing timing of the corresponding job image have been associated and in association with a job image "JOB01_20160620" stored on Jun. 20, 2016, colorimetrical values "data01_20160620" of a color verification image printed at the storing timing of the corresponding job image have been associated.

As described above, if a plurality of job images is stored, a plurality of data items on colorimetrical values is stored in association with one color verification image.

In the process of STEP S37 in which colorimetrical values obtained during a test print are compared with colorimetrical values obtained at a previous time of storing, regardless of whether a plurality of job images has been obtained by the same job, from data items on colorimetrical values of the same color verification image stored in association with the individual job images, a data item on colorimetrical values to be used in comparison with the colorimetrical values obtained during the test print may be selected. For example, in a case where different jobs use the same color verification image and identical sheets, if colorimetrical values of the color verification image obtained in one of the different jobs are selected, the color verification result of the corresponding job can be used in other jobs.

Also, since there is a plurality of data items on the past colorimetrical values stored in the storage unit 12 in association with each job image by performing job image storing a plurality of times, in the process of STEP S37 in which colorimetrical values obtained during a test print are compared with colorimetrical values obtained at a previous time of storing, from the plurality of stored data items on the past colorimetrical values, a data item on colorimetrical values to be used in comparison with the colorimetrical values obtained during the test print may be selected. In this case, it is possible to control color reproducibility on the basis of any of a plurality of printouts of the job image produced in the past.

For example, as shown in FIG. 10, in a case where n-number of images obtained by the same job are stored, n-number of data items a1 to an on colorimetrical values are stored in association with the individual job images. In a case where it is desired to perform reprinting according to color reproducibility of a job image stored at the second time, from the plurality of data items a1 to an on past colorimetrical values, the data item a2 on colorimetrical values may be selected as a data item on colorimetrical values to be used in comparison with a data item an+1 on colorimetrical values obtained during a test print.

Meanwhile, in a case where the job image is not restored ("No" in STEP S42), in STEP S43, the image generating unit 111 reads out the unrasterized PDL data of the corresponding job image from the storage unit 12, and regenerates a job image from the PDL data by performing a rasterizing process again. In STEP S44, the color converting unit 113 performs color conversion using the updated profile on the regenerated job image. After calibration of the printing unit 20 is performed in STEP S45, in STEP S46, the image processing unit 19 performs a screen process on the job image, and in STEP S40, the printing unit 20 prints the job image subjected to the screen process.

The image forming apparatus G can transfer a stored job image together with a color verification image and the colorimetrical values of the color verification image, from the image forming apparatus G to another image forming apparatuses by the communication unit 15. When another forming apparatus reprints the job image of the corresponding job, it can perform the above-described processing procedure. In this case, even in another image forming apparatus, it is possible to avoid reprinting in which the color differences between the storing timing and the reprinting timing are large. Meanwhile, the image forming apparatus G can also receive a job image, a color verification image, and the colorimetrical values of the color verification image stored in another image forming apparatus by the communication unit 15. In another image forming apparatus, reprinting of a stored job image is also possible, and it is possible to obtain color differences between a reprinting timing and an image storing timing on the basis of a color verification image and the colorimetrical values of the color verification image, before reprinting.

As described above, job images, color verification images, and colorimetrical values of the color verification images stored in the storage unit 12 can be shared with other image forming apparatuses G. In this case, in all of those image forming apparatuses, it is possible to avoid reprinting of a job image in which the color differences between the storing timing and the reprinting timing are large.

Also, if different sheets are used in printing at the storing timing of a job image and the reprinting timing of the job image, color reproducibility may change due to the difference in ground color between the sheets, and accurate color verification may become difficult. Therefore, in the procedure of the reprinting process described above, after the color of the color verification image is measured in STEP S36, the following processing procedure may be performed in parallel, thereby notifying that sheets are different from each other.

Figure 11:
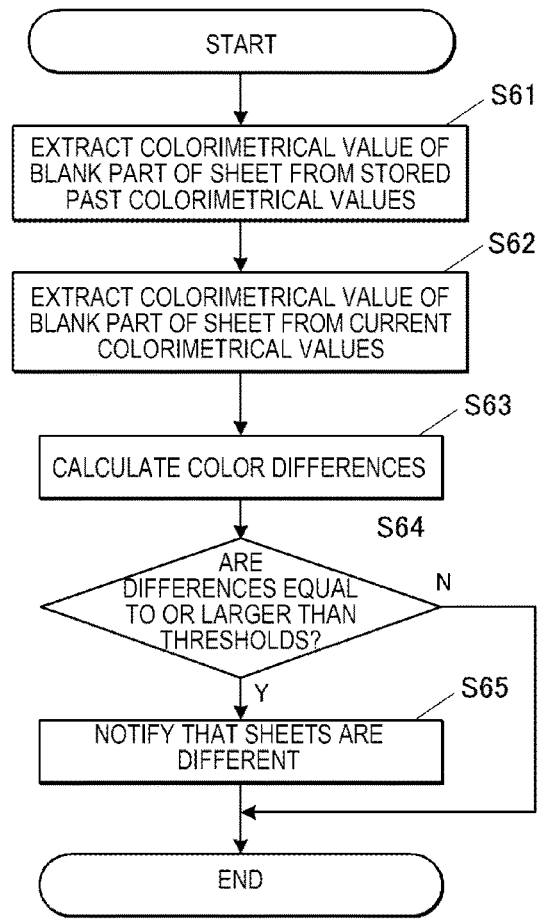
FIG. 11 is a flow chart illustrating the procedure of processing which is performed for notifying that sheets are different from each other.

FIG. 11 shows the procedure of processing for notifying that sheets are different from each other.

As shown in FIG. 11, in STEP S61, from the past colorimetrical values read out from the storage unit 12 in STEP S32 shown in FIG. 6, the reprinting control unit 115 extracts a colorimetrical value of a blank part of a sheet. Also, in STEP S62, from the colorimetrical values obtained during the current test print in STEP S36 shown in FIG. 6, the reprinting control unit 115 extracts a colorimetrical value of a blank part of a sheet. The colorimetrical value of a blank part of a sheet may be the colorimetrical value of a patch having white color, i.e., pixels having a value "0", among patches of standard colors, or may be the colorimetrical value of a non-image area such as a margin.

The reprinting control unit 115 calculates at least one of the color difference, lightness difference, and hue difference between the past colorimetrical value of the blank part and the current colorimetrical value of the blank part, in STEP S63, and compares each difference with a threshold set in advance for identifying sheets, in STEP S64. In a case where colorimetrical values of L*a*b*, each of the color difference ΔE, lightness difference ΔL*, and hue differences Δa* and Δb* between the past and the current may be compared with a threshold.

In a case where at least one of the color difference, the lightness difference, and the hue differences exceeds a corresponding threshold ("Y" in STEP S64), in STEP S65, the reprinting control unit 115 notifies that the sheet is different from the sheet used at the job image storing timing. Specifically, a message, an image, or the like notifying that the sheets are different from each other may be displayed on the display unit 14 or may be printed by the printing unit 20, whereby it is possible to perform notification. In a case where all of the color difference, the lightness difference, and the hue differences are smaller than the thresholds ("N" in STEP S64), since the sheet is identical to the sheet used at the job image storing timing, or is different from the sheet used at the job image storing timing but color reproducibility has not changed significantly, the procedure finishes without performing the above-mentioned notification.

As described above, the image forming apparatus G of the present embodiment includes the image generating unit 111 for generating a job image by a rasterizing process, the color verification image generating unit 112 for generating a color verification image including patches of a plurality of colors, the color converting unit 113 for performing the same color converting process on the job image and the color verification image, the printing unit 20 for printing the job image and the command input unit subjected to the color converting process, the colorimetry device 32 for measuring the colors of the individual patches of the printed color verification image, the storage unit 12, the storing control unit 114 for storing the job image subjected to the color converting process in the storage unit 12 in association with the color verification image subjected to the color converting process, and the colorimetrical values of the color verification image, and the reprinting control unit 115 for controlling reprinting of the job image stored in the storage unit 12. Further, the printing unit 20 performs a test print of the color verification image stored in the storage unit 12 in association with the job image before reprinting the job image stored in the storage unit 12, and the colorimetry device 32 measures the colors of the individual patches of the printout obtained by performing the test print of the color verification image, and the reprinting control unit 115 compares the colorimetrical values obtained during the test print by the colorimetry device 32 with past colorimetrical values stored in the storage unit 12 in association with the stored job image, and outputs color differences for determining whether to perform reprinting.

Therefore, it is possible to obtain the color differences between the job image storing timing and the reprinting timing, before reprinting. It is possible to use the color difference to determine whether to perform reprinting, before reprinting, and it is possible to prevent reprinting in which the color differences from the storing timing are large.

The above-described embodiment is a preferable example of the present invention, and the present invention is not limited thereto. The present invention can be appropriately modified without departing from the gist of the present invention.

For example, the configuration shown in FIG. 2 is an example, and the arrangement of the image generating unit 111, the color verification image generating unit 112, the color converting unit 113, the storing control unit 114, the reprinting control unit 115, the profile generating unit 116, and so on is not limited thereto. The image generating unit 111 and the color verification image generating unit 112 are provided in the printing controller 10; however, they may be provided in the control unit 11. Also, the storing control unit 114 and the like are provided in the control unit 11; however, they may be provided in the printing controller 10.

Also, the processing contents of the image generating unit 111, the color verification image generating unit 112, the color converting unit 113, the storing control unit 114, the reprinting control unit 115, the profile generating unit 116, and so on are implemented by a software process; however, they may be implemented with hardware obtained by modularizing them, respectively.

Even in an image forming system including the image forming apparatus, it is possible to perform the above-described processing procedure, thereby outputting color differences between a job image storing timing and a reprinting timing, before reprinting. The image forming system needs only to have the image forming apparatus, and thus may be configured to include a plurality of image forming apparatuses, or be configured to include the image forming apparatus and an image processing apparatus or include the image forming apparatus and a server. Also, in the image forming system, the arrangement of the image generating unit 111, the color verification image generating unit 112, the color converting unit 113, the storing control unit 114, the reprinting control unit 115, the profile generating unit 116, and so on is not particularly limited, and may be integrated in one image forming apparatus G or may be distributed in the image forming apparatus G and other apparatuses such as an image processing apparatus and a server.

Figure 12:
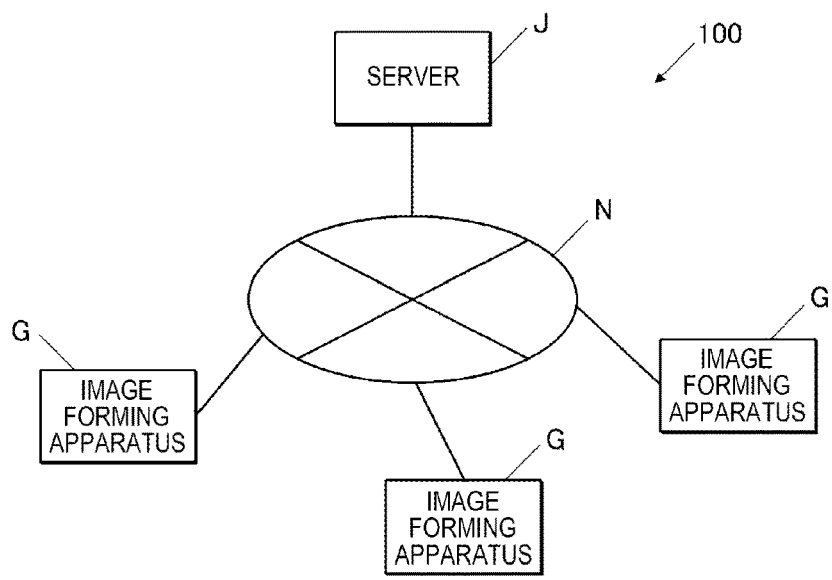
FIG. 12 is a block diagram illustrating the configuration of an image forming system of an embodiment of the present invention.

FIG. 12 shows an example of the configuration of an image forming system 100 including a plurality of image forming apparatuses G and a server J. Each image forming apparatus G can perform the above-described processing procedure, thereby outputting color differences between a storing timing and a reprinting timing of a job image before reprinting.

Although FIG. 12 shows an example in which the individual image forming apparatuses G are connected to one another through a network N, the individual image forming apparatuses G may be connected to transport paths.

Also, as a computer-readable medium of a program of the present invention, non-volatile memories such as a ROM and a flash memory, and portable recording media such as a CD-ROM can be used. Media for providing data on the program through a communication line include carrier waves.

According to an embodiment, it is possible to acquire color differences between an image storing timing and a reprinting timing before reprinting.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising:
an image generating unit generating a job image by a rasterizing process;
a color verification image generating unit generating a color verification image, the color verification image including patches of a plurality of colors;
a color converting unit performing a color converting process on the job image and the color verification image;
a printing unit printing the color converted job image and the color converted color verification image;
a colorimetry device measuring colors of individual patches of the printed color verification image;
a storage unit;
a storing control unit storing the color converted job image in the storage unit, in association with the color converted color verification image and colorimetrical values measured from the color verification image; and
a reprinting control unit reprinting the color converted job image stored in the storage unit,
wherein, before reprinting the stored job image, the printing unit performs a test print of the stored color converted color verification image associated with the job image, the colorimetry device measures the colors of the individual patches, and the reprinting control unit compares colorimetrical values measured from the test print with past colorimetrical values associated with the stored job image, and outputs color differences to determine whether to reprint.

2. The image forming apparatus according to claim 1, further comprising:
a display unit, wherein the reprinting control unit controls the display unit such that the display unit displays the color differences.

3. The image forming apparatus according to claim 2, further comprising:
a manipulation unit, wherein, in response to a reprinting instruction of a user input by the manipulation unit, the reprinting control unit controls the printing unit to reprint the stored job image.

4. The image forming apparatus according to claim 1, wherein:
the reprinting control unit controls the printing unit to reprint the stored job image when the color differences are within an allowable value.

5. The image forming apparatus according to claim 2, further comprising:
a manipulation unit,
wherein a manual option determines whether to perform reprinting based on a user's reprinting instruction and an automatic option determines whether to perform reprinting based on whether color differences are allowable values set in advance, regardless of a user's instruction,
wherein when a user's reprinting instruction selects the manual option, the reprinting control unit controls the printing unit such that the printing unit reprints the stored job image, and
wherein when the automatic option is selected by the manipulation unit, the reprinting control unit determines whether the color differences are allowable values set in advance, and if the color differences are allowable values, the reprinting control unit controls the printing unit such that the printing unit reprints the stored job image.

6. The image forming apparatus according to claim 1, wherein:
the reprinting control unit calculates one or more of a color difference, a lightness difference, and a hue difference, wherein the hue difference is between a colorimetrical value for a blank part of a sheet extracted from a previous calorimetrical value, and a calorimetrical value of a blank part of a sheet extracted from the test print's calorimetrical values; and
wherein when one or more of the color difference, the lightness difference, and the hue difference calculated exceeds a threshold, the reprinting control unit notifies the reprinting control unit that the test print sheet may be different from the sheet stored at the job.

7. The image forming apparatus according to claim 1, wherein:
the color verification image includes a media wedge defined by a standard, as patches of a plurality of standard colors.

8. The image forming apparatus according to claim 1, wherein:
the color verification image includes patches of one or more of: at least one specific color designated by a user, and at least one specific color frequently appearing in the job image.

9. The image forming apparatus according to claim 1, wherein:
the color verification image generating unit generates the same color verification image for a plurality of job images;
the storing control unit, when storing each of the job images in the storage unit, stores the same color verification image and colorimetrical values obtained from the color verification image and the colorimetrical values obtained from the same color verification image associated with the individual job images; and
the reprinting control unit selects colorimetrical values to be used in comparison with the colorimetrical values obtained during the test print.

10. The image forming apparatus according to claim 1, wherein:
when the job image is regenerated by the image generating unit, the storing control unit restores the job image, stores the job image in association with a color verification image regenerated by the color verification image generating unit together with the associated job image, and colorimetrical values obtained from the color verification image;
wherein stored colorimetrical values are associated with the individual job images by performing job image storing a plurality of times, the reprinting control unit selects colorimetrical values to be used in comparison with the colorimetrical values obtained during the test print.

11. The image forming apparatus according to claim 1, further comprising:
a communication unit to transfer, to another image forming apparatus, the stored job image, the color verification image, and the colorimetrical values associated with the job image.

12. An image forming system comprising:
an image generating unit generating a job image by a rasterizing process;
a color verification image generating unit generating a color verification image comprising patches of a plurality of colors;

a color converting unit performing a color converting process on the job image and the color verification image;

a printing unit printing the color converted job image and the color converted color verification image;

a colorimetry device measuring colors of individual patches of a printout obtained by printing the color converted color verification image;

a storage unit;

a storing control unit storing the color converted job image in the storage unit, and associate the color converted job image with the color converted color verification image, and colorimetrical values obtained from the color converted color verification image; and a reprinting control unit controlling reprinting of the job image stored in the storage unit, wherein, before reprinting the stored job image, the printing unit performs a test print of the stored color verification image associated with the job image, the colorimetry device measures the colors of the individual patches of a printout obtained by performing the test print of the color verification image, and the reprinting control unit compares colorimetrical values of the test print with past colorimetrical values associated with the stored job image, and outputs color differences t determine whether to reprint.

13. The image forming system according to claim 12, wherein:

the reprinting control unit calculates one or more of a color difference, a lightness difference, and a hue difference between a colorimetrical value of a blank part of a sheet extracted from the past colorimetrical values, and a colorimetrical value of a blank part of a sheet extracted from the colorimetrical values obtained during the test print, and wherein when one or more of the color difference, the lightness difference, and the hue difference calculated exceeds a threshold, the reprinting control unit notifies the reprinting control unit that the test print sheet may be different from the sheet stored at the job.

14. The image forming system according to claim 12, wherein:

the color verification image includes patches of one or more of: at least one specific color designated by a user, and at least one specific color frequently appearing in the job image.

15. The image forming system according to claim 12, wherein:

the color verification image generating unit generates the same color verification image for a plurality of job images;

the storing control unit, when storing each of the job images in the storage unit, stores the same color verification image and colorimetrical values obtained from the color verification image and the colorimetrical values obtained from the same color verification image associated with the individual job images; and the reprinting control unit selects colorimetrical values to be used in comparison with the colorimetrical values obtained during the test print.

16. The image forming system according to claim 12, wherein:

when the job image is regenerated by the image generating unit, the storing control unit restores the job image, stores the job image in association with a color verification image regenerated by the color verification image generating unit together with the associated job image, and colorimetrical values obtained from the color verification image;

wherein stored colorimetrical values are associated with the individual job images by performing job image storing a plurality of times, the reprinting control unit selects colorimetrical values to be used in comparison with the colorimetrical values obtained during the test print.

17. A non-transitory recording medium storing a computer readable program that, when executed on a computer, cause the computer to at least:

generate a job image by a rasterizing process;

generate a color verification image comprising patches of a plurality of colors;

perform the a color converting process on the job image and the color verification image;

print, using a printing unit, the job image and the color converted color verification image;

measure, using a colorimetry device, colors of individual patches of a printout obtained by printing the color converted color verification image;

store, in a storage unit, the color converted job image in association with the color converted color verification image, and colorimetrical values obtained from the color verification image; and perform a test print of the stored color verification image associated with the job image, before reprinting the job image stored in the storage unit;

measure the colors of the individual patches of a printout obtained by performing the test print of the color verification image by the colorimetry device; and compare colorimetrical values obtained during the test print by the colorimetry device with past colorimetrical values associated with the stored job image, and outputting color differences to determine whether to perform reprinting.

18. The non-transitory recording medium storing a computer readable program according to claim 17, wherein the program further causes the computer to at least:

calculate at least one of a color difference, a lightness difference, and a hue difference between a colorimetrical value of a blank part of a sheet extracted from the past colorimetrical values and a colorimetrical value of a blank part of a sheet extracted from the colorimetrical values obtained during the test print; and notify that there is a possibility that the sheet used in the test print is different from the sheet used at the storing timing of the job image, in a case where at least one of the color difference, the lightness difference, and the hue difference calculated exceeds a threshold.

19. The non-transitory recording medium storing a computer readable program according to claim 17, wherein:

the color verification image includes patches of one or more of: at least one specific colors designated by a user, and at least one patch of one or more specific colors frequently appearing in the job image.

20. The non-transitory recording medium storing a computer readable program according to claim 17, wherein:

when generating the color verification image, the same color verification image is generated for a plurality of job images, when storing the job image, the same color verification image and colorimetrical values obtained from the color verification image are stored in the storage unit in association with each of the job images, and when outputting the color differences, from the colorimetrical values obtained from the same color verification image and stored in the storage unit in association with the individual job images, colorimetrical values to be used in comparison with the colorimetrical value obtained during the test print are selected.

21. The non-transitory recording medium storing a computer readable program according to claim 17, wherein the program further causes the computer to perform a process of:

regenerating the job image and the color verification image, performing the same color converting process on them, printing the job image and the color verification image subjected to the color converting process, measuring the colors of the job image and the color verification image, and restoring the job image regenerated and subjected to the color converting process in the storage unit in association with the color verification image regenerated and subjected to the color converting process and colorimetrical values obtained from the regenerated color verification image, and in the process of outputting color differences, from the colorimetrical values stored in the storage unit in association with the individual job images, by performing job image storing a plurality of times, colorimetrical values to be used in comparison with the colorimetrical values obtained during the test print are selected.

\* \* \* \* \*